(12) United States Patent
Van Geer et al.

(10) Patent No.: US 8,573,695 B2
(45) Date of Patent: Nov. 5, 2013

(54) INFANT VEHICLE SEAT AND FRAME SUITABLE FOR USE WITH SUCH AN INFANT VEHICLE SEAT

(75) Inventors: Johan Van Geer, Rijswijk (NL); Donald Hendrikus Van Montfort, Heythuisen (NL); Adriaan Siewertsen, Eindhoven (NL)

(73) Assignee: Cosco Management, Inc., Wilmington, DE (US)

( * ) Notice: Subject to any disclaimer, the term of this patent is extended or adjusted under 35 U.S.C. 154(b) by 1299 days.

(21) Appl. No.: 11/149,437

(22) Filed: Jun. 8, 2005

(65) Prior Publication Data
US 2006/0006714 A1 Jan. 12, 2006

(30) Foreign Application Priority Data
Jun. 10, 2004 (NL) .................................. 1026385

(51) Int. Cl.
*B60N 2/28* (2006.01)
(52) U.S. Cl.
USPC .................................................. 297/256.16
(58) Field of Classification Search
USPC ............................ 297/256.16, 485; 280/801.1
See application file for complete search history.

(56) References Cited

U.S. PATENT DOCUMENTS

| 4,893,835 A * | 1/1990 | Linden ......................... 280/808 |
| 5,236,221 A * | 8/1993 | Minami ........................ 280/806 |
| 5,611,596 A * | 3/1997 | Barley et al. ............. 297/256.13 |
| 5,839,789 A * | 11/1998 | Koledin ........................ 297/476 |
| 6,247,208 B1 * | 6/2001 | Creech ......................... 24/68 BT |
| 6,508,510 B2 * | 1/2003 | Yamazaki .................. 297/250.1 |
| 6,626,493 B2 * | 9/2003 | Kain ........................... 297/250.1 |
| 7,163,265 B2 * | 1/2007 | Adachi .................... 297/256.12 |
| 7,195,315 B2 * | 3/2007 | Rikhof ..................... 297/256.16 |
| 2002/0043838 A1 * | 4/2002 | Yanaka et al. ............. 297/250.1 |
| 2002/0062543 A1 | 5/2002 | Dittmar et al. .................. 29/278 |
| 2003/0151286 A1 * | 8/2003 | Kain ........................ 297/256.16 |

FOREIGN PATENT DOCUMENTS

| EP | 1369296 A1 * | 5/2003 |
| EP | 1 407 922 A2 | 4/2004 |
| NL | 9500514 | 10/1996 |
| WO | WO-2004/033251 A1 * | 4/2004 |

* cited by examiner

Primary Examiner — David Dunn
(74) Attorney, Agent, or Firm — Barnes & Thornburg LLP (57) ABSTRACT

The invention relates to an infant vehicle seat that is suitable for being mounted in a vehicle with a safety belt system that is present in the vehicle, which infant vehicle seat comprises a frame, a seat bucket connected to the frame as well as at least one belt tensioning device for tensioning at least one belt of said safety belt system. The tensioning device is movable from a first position located near a rear side of the frame to a second position spaced from the rear side, in which position the belt is tensioned by means of the belt tensioning device in use.

13 Claims, 7 Drawing Sheets

INFANT VEHICLE SEAT AND FRAME SUITABLE FOR USE WITH SUCH AN INFANT VEHICLE SEAT

The invention relates to an infant vehicle seat suitable for being mounted in a vehicle by means of a safety belt system that is present in the vehicle, which infant vehicle seat comprises a frame, a seat bucket connected to the frame as well as at least one belt tensioning device for tensioning at least one belt of said safety belt system.

The invention further relates to a frame suitable for use with such an infant vehicle seat.

The term rear side of the frame as used herein is understood to be the side that is located near the backrest of the vehicle seat upon placement of the infant vehicle seat into a vehicle.

With such a vehicle seat, which is known from Dutch Patent No. NL-193778, the frame of the infant vehicle seat is placed into abutment with a seat portion and a backrest of a vehicle seat in the vehicle, after which a so-called three-point seat belt is passed through a space between the frame and a seat bucket and subsequently connected to a buckle lock by means of a usual buckle tongue. The lap belt is guided over two belt guides present in the frame on either side thereof. To tension the lap belt, a belt tensioning device is moved between the belt guides from a front side of the frame, with the belt tensioning device pressing the lap belt between the belt guides towards the rear side of the frame, as a result of which the lap belt is tensioned.

A drawback of such an infant vehicle seat is the fact that at least two belt guides are required, between which the belt tensioning device as well as the belt are movable.

The object of the invention is to provide an infant vehicle seat wherein a belt can be tensioned in a relatively simple manner.

This object is accomplished with the infant vehicle seat according to the invention in that the tensioning device is movable from a first position located near a rear side of the frame to a second position spaced from the rear side, in which position the belt is tensioned by means of the belt tensioning device in use.

In this way the belt is moved in a direction towards the front side of the frame, thus tensioning the belt, which is connected to the vehicle on either side of the frame with both ends, without belt guides between which the belt is pressed being required. In addition, the number of parts that is loaded relatively heavily in case of a collision is comparatively small, so that only a limited number of parts needs to be designed to be capable of absorbing said forces.

One embodiment of the infant vehicle seat according to the invention is characterized in that the belt is passed over the belt tensioning device in said first position, with the belt tensioning device is forming a belt guide.

In this way the belt tensioning device can also function as a belt guide upon fitting the belt In the frame, thus making it easy to position the belt in the frame.

Another embodiment of the infant vehicle seat according to the invention is characterized in that the infant vehicle seat is provided with a recess located opposite the belt tensioning device, in which recess the belt tensioning device is at least partially accommodated in said second position, as a result of which the belt is clamped between the recess and the belt tensioning device in use.

In this way the movement of the belt tensioning device to said second position, in which the belt tensioning device is accommodated in the recess, not only causes the belt to be tensioned, as a result of which the infant vehicle seat is effectively secured against movement in the driving direction of the vehicle, but in addition the infant vehicle seat is clamped or locked in position with respect to the belt. This prevents sliding movement of the infant vehicle seat over the belt in a direction transversely to the driving direction and in a direction parallel to the belt, thus effecting a more stable fixation of the infant vehicle seat.

Yet another embodiment of the infant vehicle seat according to the invention is characterized in that the frame is provided with an element extending from the rear side of the frame for guiding a lap the belt as well as a shoulder belt of the safety belt system of the vehicle, said lap belt and said shoulder belt extending parallel to each other at least at the location of the belt tensioning device, with respect to which element the belt tensioning device is movable for tensioning the lap belt and the shoulder belt simultaneously.

In this way both the lap belt and the shoulder belt are tensioned, so that an adequately tensioned position of the infant vehicle seat in the vehicle is ensured also in a situation in which the shoulder belt is pulled further out of an automatic safety belt retractor that is connected to the vehicle, for example. When the belts are clamped down, the belt lengths on either side of the clamping engagement are moreover fixed, so that a firm fixation is ensured.

Yet another embodiment of the infant vehicle seat according to the invention is characterized in that the belt tensioning device comprises a slide.

Using the slide, the belt can be moved from the rear side to the front side of the infant vehicle seat and be tensioned in a simple and efficient manner.

Yet another embodiment of the infant vehicle seat according to the invention is characterized in that the tensioning device is positioned at least substantially centrally between two longitudinal sides of the frame.

When such a centrally positioned tensioning device is used, tensioning of the belts can take place in a simple manner, with said one tensioning device being suitable for use both in a situation in which the shoulder belt extends on the left-hand side and in a situation in which the belt extends on the right-hand side.

The invention will be explained in more detail with reference to the drawings, in which.

In the figures, like parts are indicated by the same numerals.

Figure 1:
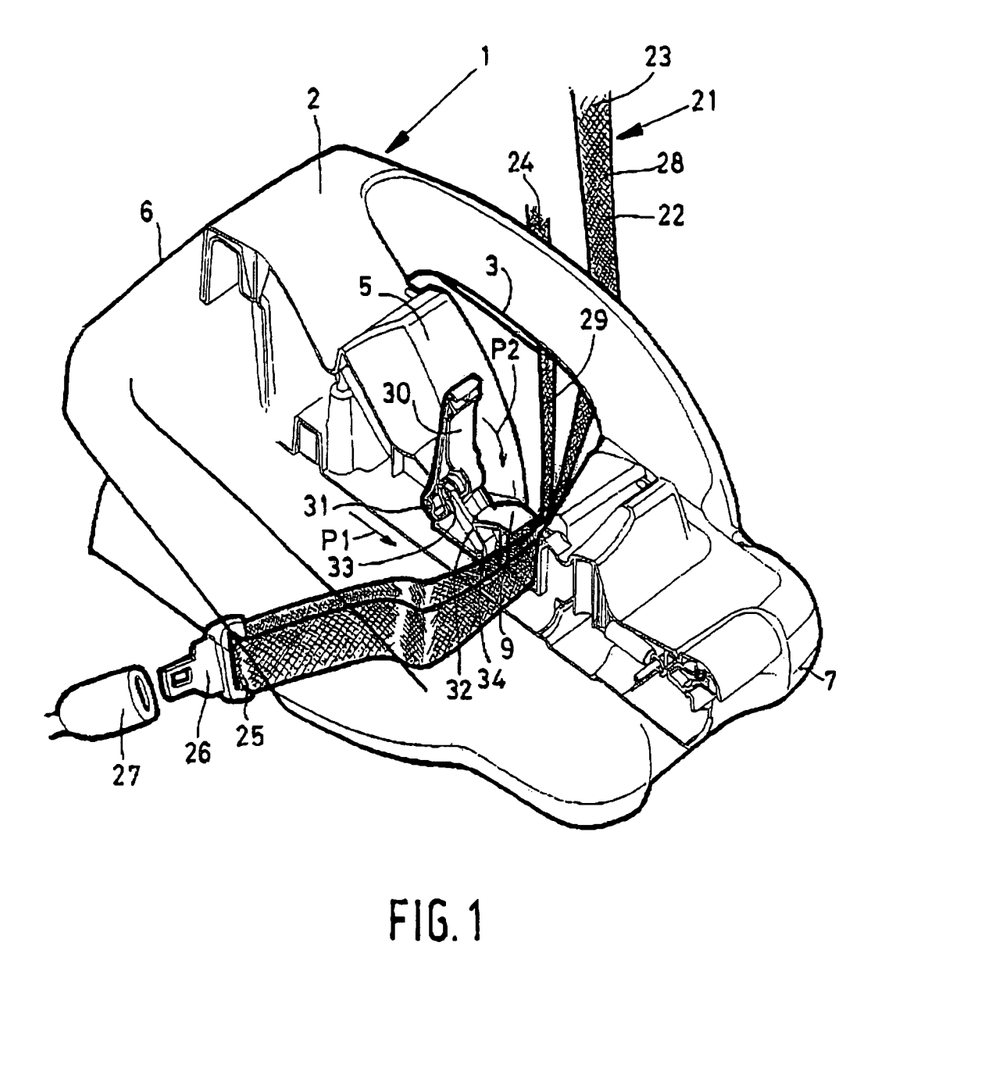
FIG. 1 is a perspective view of a frame suitable for use with an infant vehicle seat according to the invention.
Figure 2:
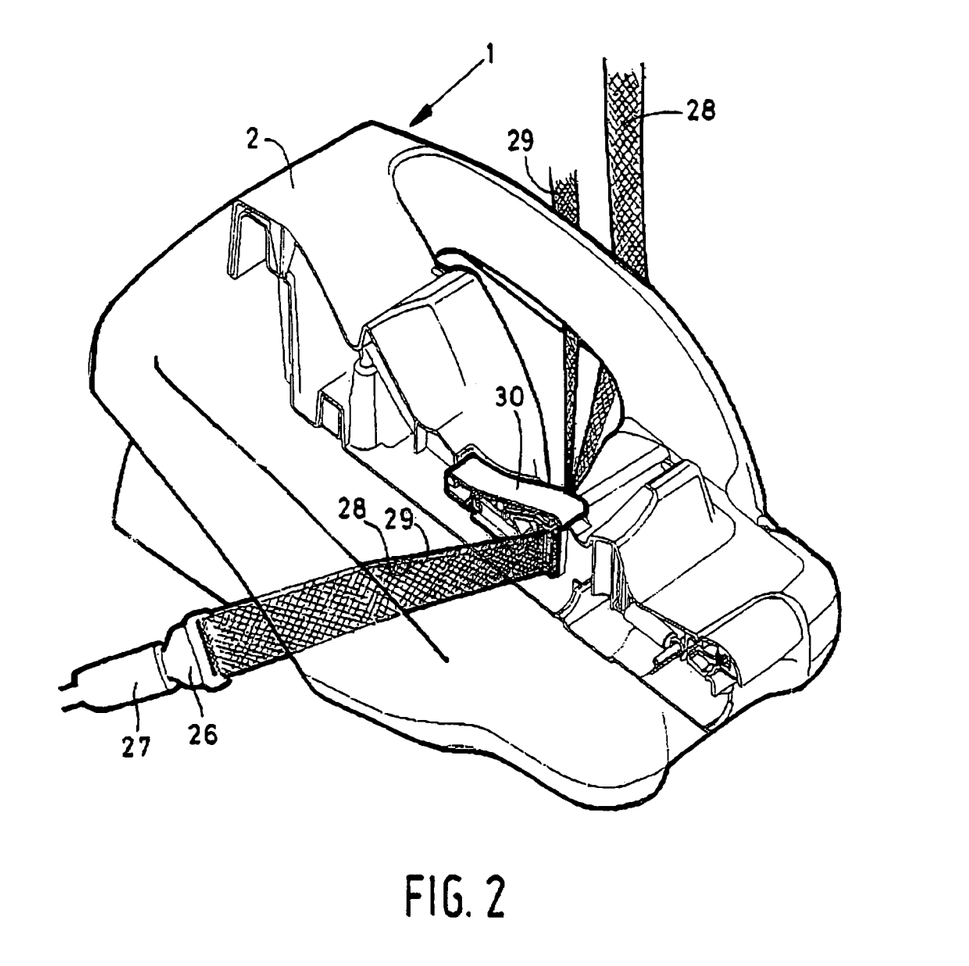
FIG. 2 shows the frame of FIG. 1 with tensioned belts arranged therein.
Figure 3A:
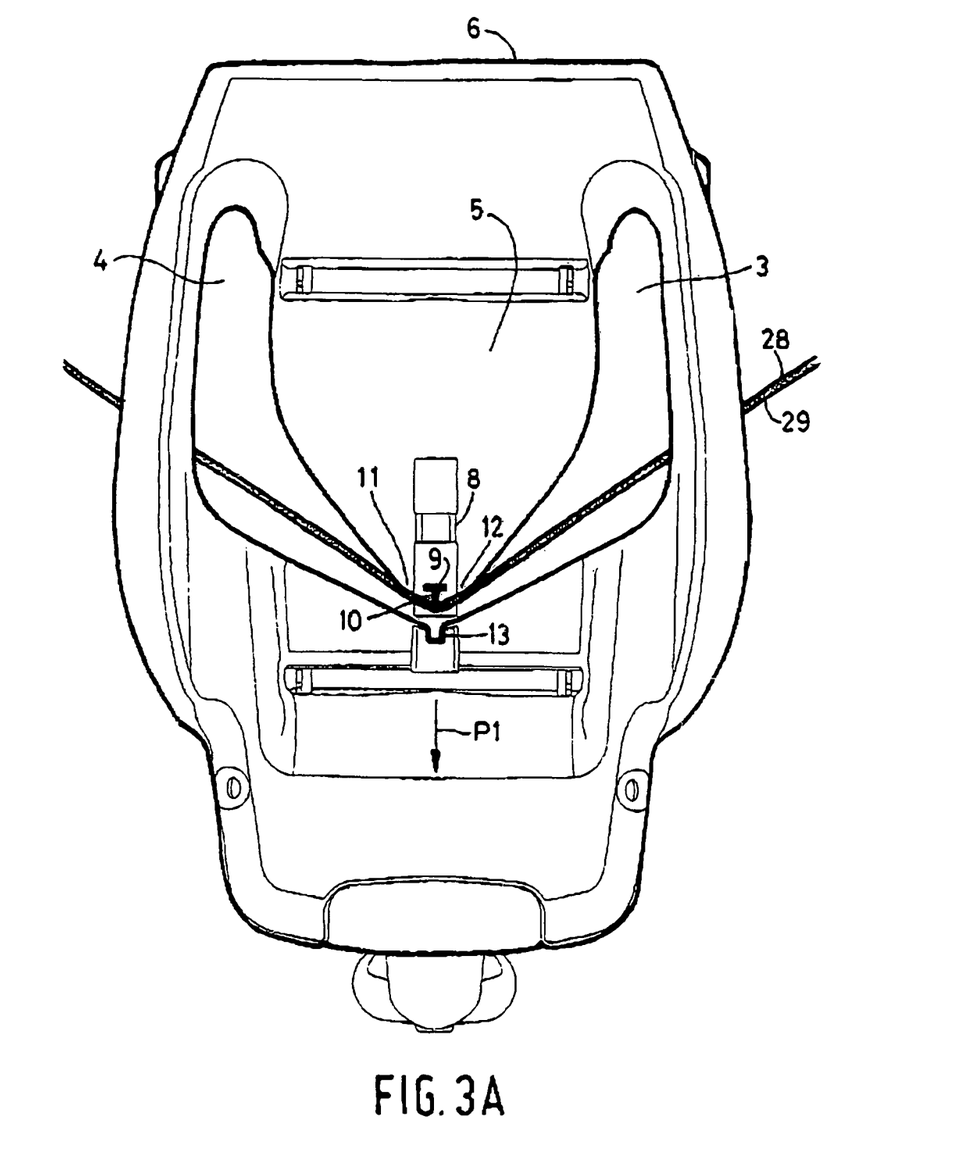
FIGS. 3A and 3B are top plan views, partially in section, of the frame of FIGS. 1 and 2, respectively.
Figures 3B, 3C:
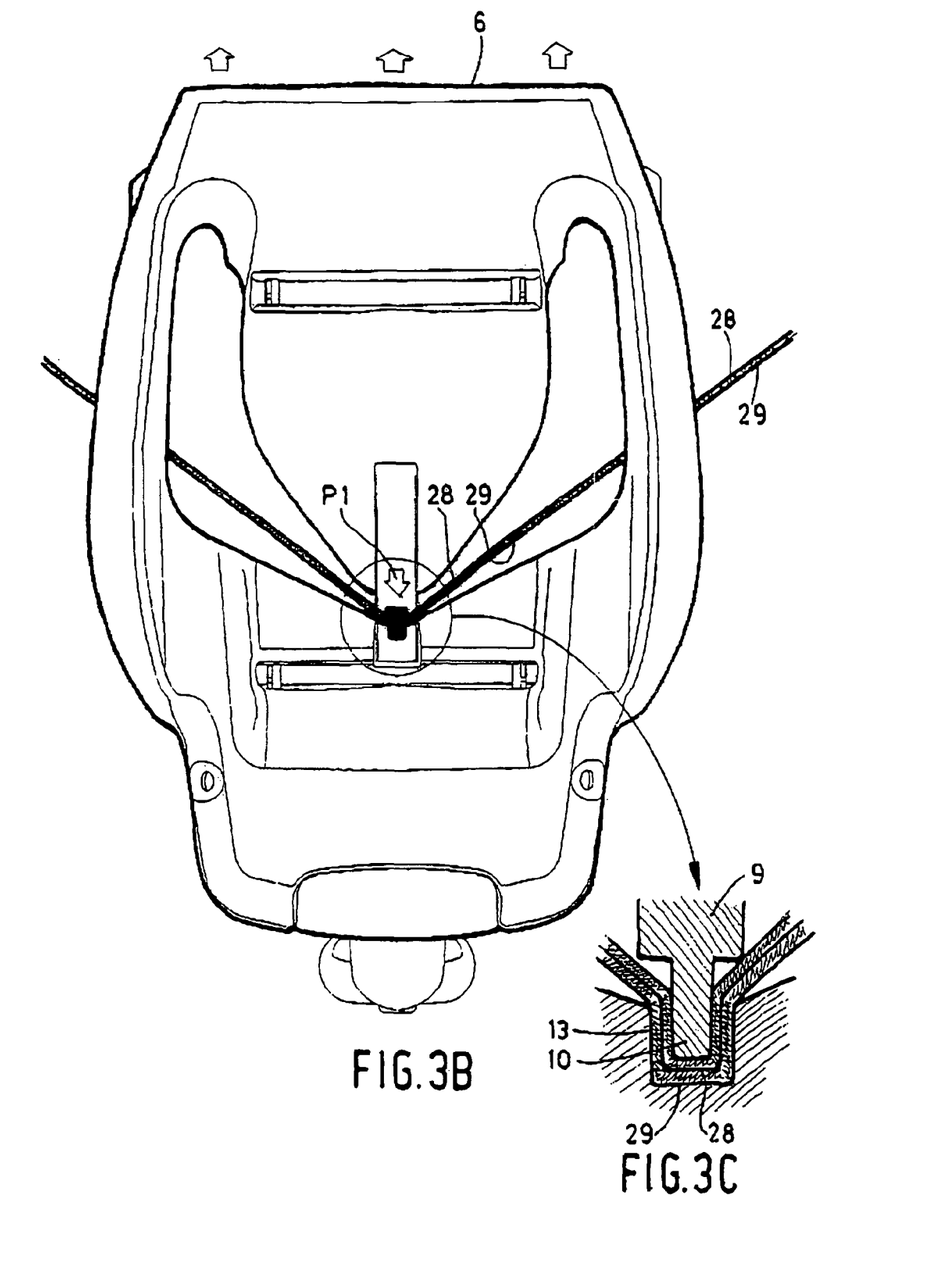
FIG. 3C shows an enlarged detail of the frame that is shown in FIG. 3B.

FIGS. 1-3C show a first embodiment of a frame 1 according to the invention. FIGS. 1 and 2 are partially cutaway views, so that the interior of the frame 1 is clearly visible. The frame 1 comprises a shell 2 of plastic material. In the two longitudinal sides of which belt passages 3, 4 are formed. A V-shaped element 5 is positioned between the belt passage is 3, 4, which element is relatively wide on a side facing towards the rear side 6 of the frame, whereas the side present at the front side 7 of the frame 1 is relatively narrow. At the front side, the element 5 is provided with an elongated slot 8 near the centre, in which a slide 9 is movable in the direction indicated by the arrow P1 and in the opposite direction. A front side 10 (FIG. 3C) of the slide 9 preferably extends beyond the ends 11, 12 of the element 5 that are located on either side of the slide 9. Opposite the slide 9, the frame 1 is provided with a recess 13 whose shape corresponds to that of the end 10 of the slide 9. The dimensions of the recess 13 are slightly larger than those of the end 10, so that preferably two belts can be clamped between the end 10 and the recess 13.

The frame 1 can be secured to a seat (not shown) of a vehicle (not shown) by means of a safety belt system 21 of the vehicle.

The safety belt system 21 comprises an elongated belt 22, which is connected, with a first end 23, to an automatic seat belt retractor (not shown) that is known per se, in which the belt 22 is automatically wound up. The end 24 of the belt remote from the end 23 is connected to the vehicle at the location of a transition between a backrest and a seat portion of a vehicle. The belt 22 extends through an opening 25 in a buckle tongue 26. The buckle tongue 26 can be connected to a buckle lock 27 that is known per se, which buckle lock is conventionally positioned at a transition between the backrest and the seat portion of the vehicle seat. The part between the buckle tongue 26 and the end 23 is called the shoulder belt 28, whilst the part between the buckle tongue 26 and the end 24 is called the lap belt 29.

To secure the frame 1 to a vehicle seat, the frame 1 is placed on the seat portion of the vehicle seat, with the rear side 6 abutting against the backrest of the vehicle seat. The buckle tongue 26 is then passed through the belt passage 3, passed over the element 5 and the end 10 of the slide 9 and subsequently led through the belt passage 4 to the buckle lock 27 of the vehicle. After the buckle tongue 26 has been locked in position in the buckle lock 27 and the belt 22 has been tensioned in a usual manner, for example by means of an automatic belt retractor, the shoulder belt 28 and the lap belt 29 extend parallel to each other opposite the end 10 of the slide 9. Subsequently, a handle 30 located near the slide 9 is pivoted about a pivot 31 pin from the position that is indicated by the arrow P2 in FIG. 1 to the position that is shown In FIG. 2. A connecting rod 32 is positioned between the handle 30 and the slide 9 that is movable in the direction indicated by the arrow P1, which connecting rod is connected to the handle 30 via a pivot pin 33 and to the slide the 9 via a pivot pin 34. Pivoting of the handle 30 from the position that is shown in FIG. 1 to the position that is shown in FIG. 2 causes the slide 9 to move in the direction indicated by the arrow P1, as a result of which also the shoulder belt 28 and lap belt 29 abutting against the end 10 are moved in the direction indicated by the arrow P1 until the end 10 is positioned in the recess 13 and the shoulder belt 28 and the lap belt 29 are folded round the end 10 and pressed into the recess 13. The shoulder belt 28 and the lap belt 29 are now both tensioned in the driving direction of the vehicle as indicated by the arrow P1, whilst in addition the frame 1 is clamped round the shoulder belt 28 and the lap belt 29 as a result of the clamped connection between the end 10 and the recess 13, so that the frame 1 cannot be moved over the belts in the longitudinal direction thereof.

Figure 4:
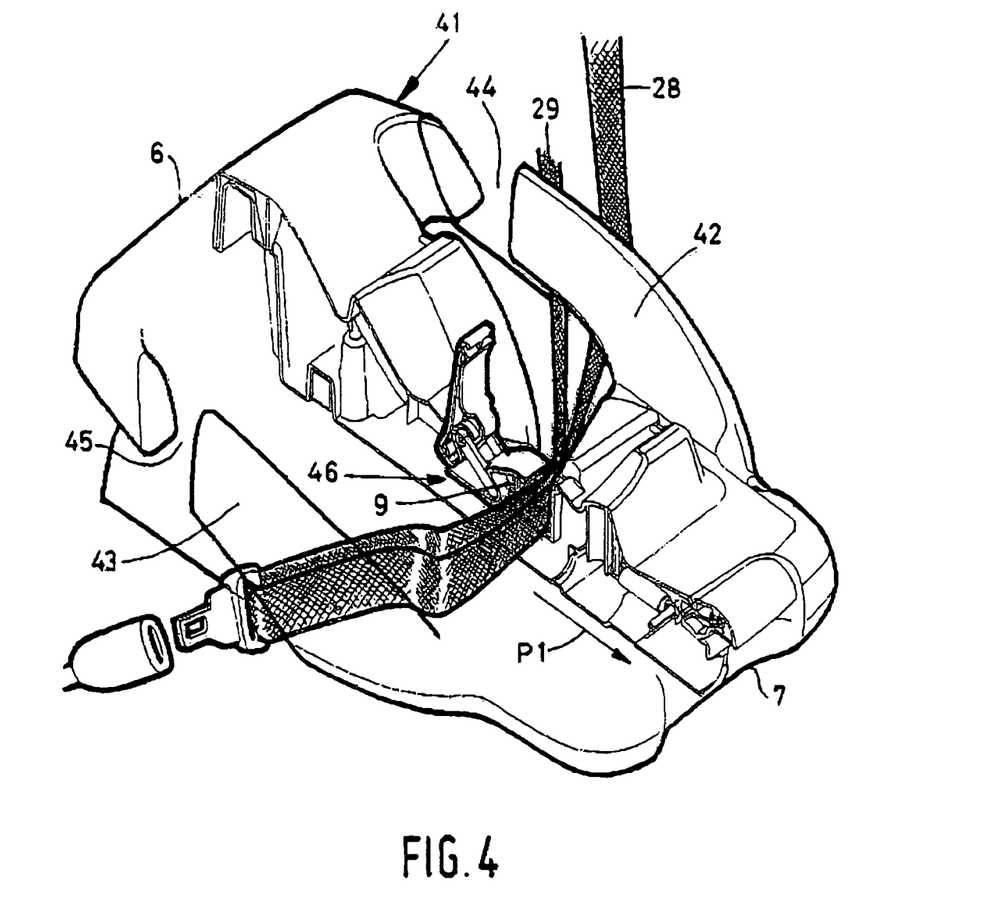
FIG. 4 shows a second embodiment of a frame according to the invention.

FIG. 4 shows a second embodiment of a frame 1 of an infant vehicle seat according to the invention, in which the frame 41 is different from the frame 1 in that it is not provided with belt passages 3, 4 that are surrounded by the frame 1 on all sides but is provided with arms 42, 43 that extend from the front side 7 to the rear side 6 of the frame 41, leaving clear belt passage slots 44, 45. Similarly to the frame 1, the frame 41 is provided with a belt tensioning device 46, which comprises a similar slide 9 that is movable in the direction indicated by the arrow P1. With the frame 41 it is possible to position either both belts or only the lap belt 29 around the slide 9 via the belt passage slots 44. 45.

The centrally positioned tensioning device 46 makes it possible to tension the belts 28, 29 both in the situation in which the shoulder belt 28 extends upwards on the right-hand side of the frame 41 and in the situation in which the shoulder belt 28 extends upwards on a left-arm side of the frame 41.

It is also possible not to provide the infant vehicle seat with a recess 13, in which case the belt(s) is (are) only tensioned in the direction indicated by the arrow P1 by means of the slide 9.

Figure 5:
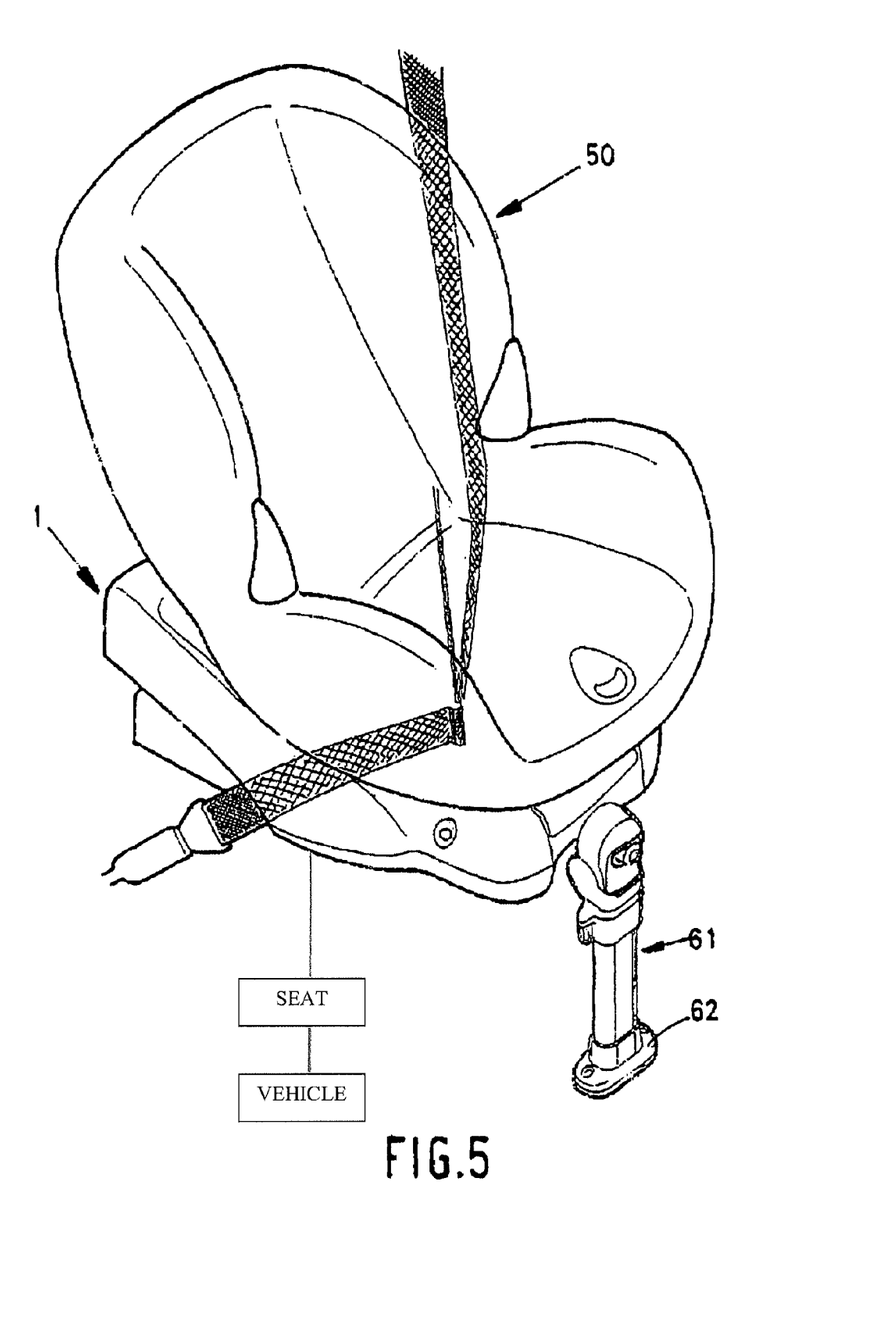
FIG. 5 is a perspective view of a frame with a seat detachably connected thereto.
Figure 6:
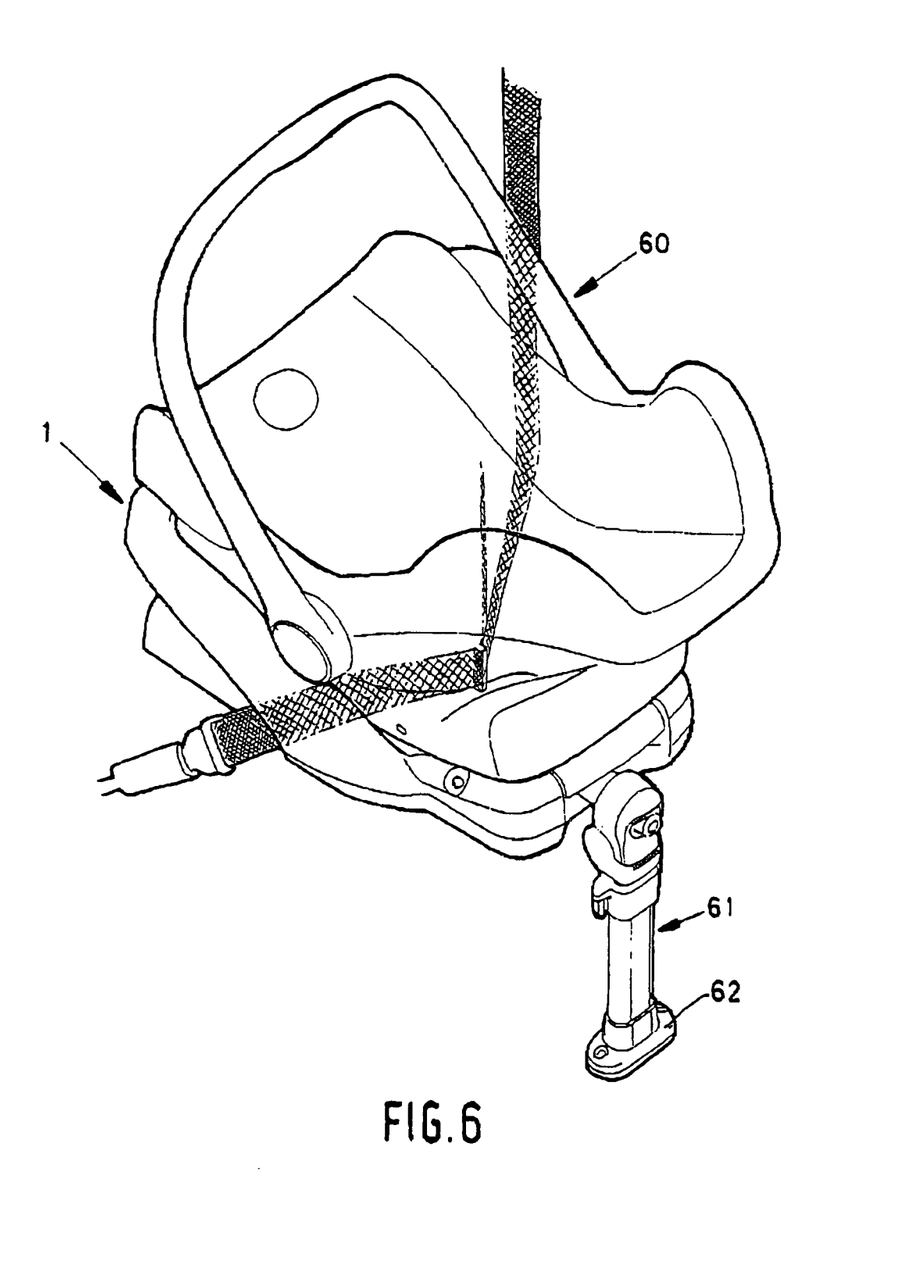
FIG. 6 shows the frame of FIG. 5 with a baby bucket detachably connected thereto.

FIGS. 5 and 6 show applications for the frame 1 according to the invention in which a seat 15 and a baby bucket 60, respectively, are detachably connected to the frame 1 by means that are known per se. The frame 1 is furthermore provided with a footrest 61, via which the frame 1 is supported on a floor of the vehicle with a baseplate 62 on a side remote from the frame 1.

The seat bucket, in which an infant can be seated, may also be fixedly connected to the frame. The seat bucket is preferably capable of tilting movement with respect to the frame. The seat bucket and the frame may also be integrated into one unit.

It is also possible to position the tensioning device in the seat bucket or in another part that is to be connected to the seat bucket.

The invention claimed is:

1. An infant vehicle seat suitable for being mounted in a vehicle with a safety belt system that is present in the vehicle, the infant vehicle seat comprising:
    a frame having a front side, a rear side and a recess therein,
    a seat bucket connected to the frame,
    the frame and seat bucket being adapted for mounting in the vehicle so that the seat bucket faces forward toward the front of the vehicle with the frame front side being toward the front of the vehicle and the frame rear side being further away from the front of the vehicle, and
    at least one belt tensioning device associated with the frame for tensioning at least one belt of said safety belt system, wherein the tensioning device is movable from a first position in direction towards the front side of the frame to a second position, wherein upon moving from the first position to the second position moves a portion of the at least one belt forward so that the at least one belt is positioned against the tensioning device and frictionally engages with the frame recess to tension the at least one belt.

2. An infant vehicle seat according to claim 1, wherein the at least one belt is passed over the belt tensioning device in said first position, with the belt tensioning device forming a belt guide.

3. An infant vehicle seat according to claim 1, wherein the frame is provided with an element extending from the rear side of the frame for guiding a lap belt as well as a shoulder belt of the safety belt system of the vehicle, said lap belt and said shoulder belt extending parallel to each other at least at the location of the belt tensioning device, the belt tensioning device is movable with respect to the element for tensioning the lap belt and the shoulder belt simultaneously.

4. An infant vehicle seat according to claim 1, wherein tensioning device is positioned at least substantially centrally between two longitudinal sides of the frame.

5. An infant vehicle seat suitable for being mounted in a vehicle with a safety belt system that is present in the vehicle, the infant vehicle seat comprising:
    a frame having a front side, a rear side and a recess therein, a seat bucket connected to the frame, the frame and seat bucket being adapted for mounting in the vehicle so that the seat bucket faces forward toward the front of the vehicle with the frame front side being toward the front of the vehicle and the frame rear side being further away from the front of the vehicle, and at least one belt tensioning device associated with the frame for tensioning at least one belt of said safety belt system, wherein the tensioning device is a slide movable from a first position in direction towards the front side of the frame to a second position, wherein upon moving from the first position to the second position a portion of the at least one belt that is positioned against the tensioning device frictionally engages with the frame recess to tension the at least one belt.

6. An infant vehicle seat adapted for mounting in a vehicle, the vehicle having a safety belt system, the infant vehicle seat comprising:

a frame having a recess therein, a seat bucket coupled to the frame, the frame and seat bucket being adapted for mounting in the vehicle so that the seat bucket faces forward toward the front of the vehicle with the frame front side being toward the front of the vehicle and the frame rear side being further away from the front of the vehicle, and a clamping device slidable in a forward direction and coupled to the frame for clamping a belt of said safety belt system to secure the frame to the vehicle with the belt, wherein the clamping device comprises a clamping element having an end whose shape corresponds to the shape of the recess so that the end can enter the recess with the belt between the end and the recess whereby the belt is clamped to the frame.

7. The infant vehicle seat of claim 6, wherein the dimension of the recess is slightly larger than the end so that the belt can be clamped between the end and the recess.

8. An infant vehicle seat according to claim 6, wherein the end is adapted to move from a first position outside of the recess to a second position in the recess and wherein the belt is movable in a direction along the length of the belt when the belt is between the end and the recess in the first position and the belt is clamped between the end and the recess in the second position.

9. The infant vehicle seat of claim 8, wherein the clamping element comprises a slide movable from the first position to the second position.

10. The infant vehicle seat of claim 6, wherein the recess has sides spaced to enable the end and the belt to be clamped between the sides of the recess.

11. An infant vehicle seat adapted for mounting in a vehicle, the vehicle having a safety belt system, the infant vehicle seat comprising:

a frame having a recess therein, a seat bucket coupled to the frame, the frame and seat bucket being adapted for mounting in the vehicle so that the seat bucket faces forward toward the front of the vehicle, the safety belt system comprising a belt having a first end connected to the vehicle on one side of the frame and seat bucket, the belt having a second end adapted to be connected to the vehicle on a second side of the frame and seat bucket, and a clamping device coupled to the frame for clamping a belt of said safety belt system to secure the frame to the vehicle with the belt, wherein the clamping device comprises a clamping element having an end whose shape enables clamping of the belt in the recess by moving the end slidably toward the front of the vehicle seat.

12. The infant vehicle seat of claim 11, wherein the end is adapted to move toward the front of the vehicle and press the belt into the recess adding tension to the belt and enhancing securement of the infant vehicle seat in the vehicle.

13. An infant vehicle seat suitable for being mounted in a vehicle with a safety belt system that is present in the vehicle, the infant vehicle seat comprising:

a frame, a seat bucket connected to the frame, at least one belt tensioning device associated with the frame for tensioning at least one belt of said safety belt system, the tensioning device being movable from a first position to a second position, whereby the belt is moved linearly in a direction towards the front side of the frame and is tensioned by means of the belt tensioning device in use, the first position is located near a rear side of the frame whilst the second position is spaced from the rear side and closer to the front side, the frame is provided with a recess located opposite the tensioning device closer to the front side then the tensioning device, whereby in the second position the belt tensioning device is at least partially accommodated in the recess, as a result of which the belt is clamped between the recess and the belt tensioning device in use.

* * * * *